United States Patent [19]

Lisle et al.

[11] 3,775,768
[45] Nov. 27, 1973

[54] ADAPTIVE MTI CLUTTER FILTER
[75] Inventors: Hampton H. Lisle, Crownsville; Robert B. Hughes, College Park, both of Md.
[73] Assignee: Westinghouse Electric Corporation, Pittsburgh, Pa.
[22] Filed: Dec. 6, 1971
[21] Appl. No.: 204,824

[52] U.S. Cl. ............................. 343/7.7, 343/17.1 R
[51] Int. Cl. ............................................... G01s 9/42
[58] Field of Search ........................ 343/7.7, 17.1 R

[56] References Cited
UNITED STATES PATENTS

| | | |
|---|---|---|
| 3,576,564 | 4/1971 | Galvin .................................. 343/7.7 |
| 3,587,097 | 6/1971 | Stull, Jr. ................................ 343/7.7 |
| 3,176,293 | 3/1965 | Nolan et al. .................... 343/17.1 R |
| 3,149,333 | 9/1964 | Campbell ....................... 343/17.1 R |

Primary Examiner—Benjamin A. Borchelt
Assistant Examiner—G. E. Montone
Attorney—F. H. Henson et al.

[57] ABSTRACT

A system for enhancing AMTI radar target velocity (Doppler) visibility in reduced clutter to noise environment by utilizing MTI filters selectively coupled into the system whose rejection characteristic is chosen as a function of clutter amplitude level as well as bandwidth whereby excessive signal rejection is not introduced with consequent target invisibility.

7 Claims, 4 Drawing Figures

ADAPTIVE MTI CLUTTER FILTER

The invention herein described was made in the course of or under a contract or subcontract thereunder with the Department of the Air Force (Contract F33657-69-C-0972)

BACKGROUND OF THE INVENTION

Field of the Invention

This invention relates generally to coherent pulse Doppler radar systems and more particularly to an AMTI system. The purpose of this invention is to incorporate and control moving target indicator (MTI) apparatus in response to clutter level as well as bandwidth.

Description of the Prior Art

An AMTI radar is a low PRF pulse Doppler radar system capable of detecting and tracking moving targets where the target return is time coincident with heavy ground clutter. This capability is realized by discriminating against stationary ground return signals in the frequency domain while accepting returns from moving targets whose Doppler frequencies differ from the Doppler frequency of the stationary ground clutter. A characteristic feature of such radar is that the transmitted signal is coherent with the reference signal in the receiver. Such systems are generally disclosed in the "Introduction to Radar Systems", by Skolnik, published by McGraw-Hill (1962).

Present airborne pulsed Doppler radars having MTI capability however do not incorporate clutter rejection filters which are responsive to clutter amplitude level. Generally, when clutter radar return signals exceed a predetermined threshold level, an MTI unit is enabled in the radar in order to reject the spectrum of frequencies associated with the clutter; however, an inherent excessive frequency visibility loss occurs. In these prior art systems, the clutter filter reject bands thus vary dependent upon spectral clutter width only. The frequency periodic main beam clutter (MBC) spectral width is primarily a function of radar velocity $v$ and antenna squint angle $\psi$. Furthermore, the —6 db bandwidth BW of the main beam clutter can be expressed by the following approximation:

$$BW = \Delta f \cong [(2v\sin\psi)(\beta a)]/\lambda$$

where $\lambda$ = transmitted wavelength, and
$\beta a$ = antenna azimuth beamwidth.

Accordingly, a clutter spectral width sensitive system will vary the clutter reject bandwidth of a comb or notch filter as a function of $v \sin\psi$ or $v \sin\psi/f_r$ where $f_r$ is the pulse repetition frequency of the transmitted radar pulses. Such a configuration is adapted to maintain the clutter rejection constant at a level on the order of —60 db below the target return signal. The pulse repetition frequency (PRF) is sometimes taken into account since a comb or notch filter characteristic is dependent upon the PRF due to the fact that the spectral line of the transmitted pulse and its harmonics as well as the spectrum of the clutter are separated by a frequency equal to the PRF.

SUMMARY

The present invention is directed to a clutter canceller notch filter selection means included in an MTI radar wherein the filter characteristic is varied as a function of both the clutter amplitude and spectral width. A first and a second notch filter having a controlled characteristic respectively receive digital inputs corresponding to the in-phase and quadrature components, respectively, of the radar return signals. The filter characteristics are selectively switched in accordance with the output of a logic circuit which is responsive to an input signal which is a function of the clutter amplitude as well as the clutter bandwidth, and a plurality of stored threshold signals. The input signal to the logic circuit is derived from a signal mixer which receives a digital input signal corresponding to $v \sin\psi$ and an input proportional to the clutter amplitude. The clutter amplitude is determined by circuit means which samples a selective number of video ground echo samples derived from the absolute value of the in-phase and quadrature components of the radar return signals which are integrated in a post detection integrator and summed in an accumulator during each radar look time, wherein the radar look time is defined as the period in which a constant PRF is transmitted. The input to the logic circuit is compared with the plurality stored thresholds which correspond to desired rejection notch filter characteristics. When a comparison is present, an enabling signal is fed to both clutter rejection filters which alter their feedback characteristics to provide a desired notch filter rejection characteristic. This characteristic comprises a relatively narrower reject frequency notch than would be utilized wherein the system was responsive to clutter bandwidth only.

DESCRIPTION OF THE PREFERRED EMBODIMENT

Figure 1:
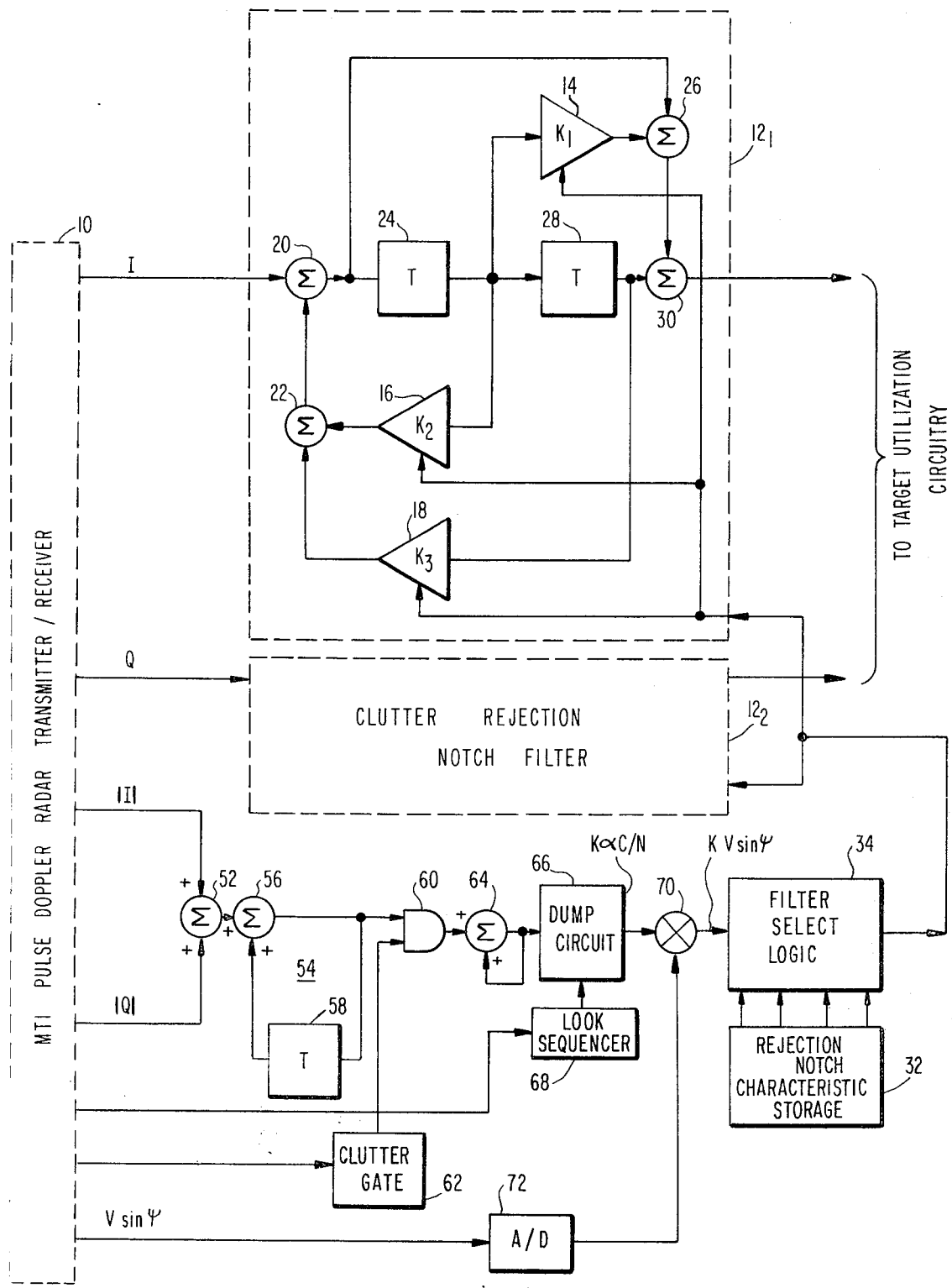
FIG. 1 is a block diagram illustrative of the preferred embodiment of the subject invention.

Referring now to the drawings and more particularly to FIG. 1, reference numeral 10 generally designates a coherent pulse Doppler radar system having moving target indication (MTI) capability. As is well known to those skilled in the art, such a system transmits coherent radar pulses, that is pulses which are in phase with the reference signal in the receiver. Current radars include a transmitter and receiver section which generate the radar pulses transmitted and digitally processes the radar return signals, respectively. The present invention is coupled into the radar receiver portion of the radar system at the output of the video detector, which is responsive to the IF signal derived by mixing the RF return signals with a portion of a microwave stabilized locked oscillator or STALO and then making an analog to digital conversion. The in-phase and quadrature digital video signals I and Q are respectively fed to clutter rejection notch filters $12_1$ and $12_2$ whose outputs are then coupled to target utilization circuitry, not shown.

Both filters $12_1$ and $12_2$ are identical and comprise recursive digital filters having digital multiplier amplifiers 14, 16 and 18 whose gains $K_1$, $K_2$ and $K_3$ are controlled in accordance with a desired notch filter characteristic as a result of a measurement not only of the clutter bandwidth, but also its mean or average amplitude. The preferred embodiment of the notch filters are as shown by the block diagram associated with filter 12.

Considering now the notch filter $12_1$, in addition to the digital multipliers 14, 16 and 18, the input signal I which comprises the in-phase video of the radar echo samples is fed to one input of a dual input signal summer 20 which has its other input coupled from the output of a second signal summer 22. The output of mixer 20 is commonly fed to the input of a first time delay circuit 24 and a third signal summer 26. The delay of the time delay circuit 24 is substantially equal to a period corresponding to 1/PRF of the transmitted radar pulses. The output of the time delay circuit 24 is commonly fed to the input of a second time delay circuit 28 as well as to the inputs of feedback amplifiers 14 and 16. The output of the feedback amplifier 14 is fed to the third signal summer 26 which in turn has its output connected to one input of a fourth signal summer 30. Th other input to the signal summer 30 is comprised of the output of the second time delay circuit 28. Moreover, the output of the second time delay circuit 28 is fed to the input of feedback amplifier 18 whose output is connected to the other input of signal summer 22. The output from the filter is taken from the output of the fourth summer 30.

The feedback constants $K_1$, $K_2$ and $K_3$ are controlled by enabling signals which correspond to predetermined rejection notch characteristics. This is achieved by means of a signal storage 32 and filter select logic circuit 34. The logic circuit compares an input signal corresponding to $K \, v \, \sin\psi$ with a predetermined number of threshold values which when a comparison is made between the input and any one of the stored thresholds the feedback constants $K_1$, $K_2$ and $K_3$ are altered to provide the proper notch filter characteristic.

Figure 2:
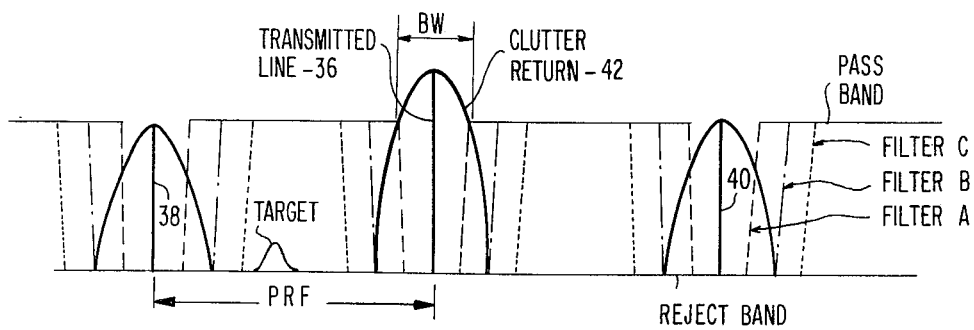
FIG. 2 illustrates the frequency spectrum of the system operating with different notch rejection filter characteristics.

Referring now briefly to FIG. 2, there is illustrated the frequency spectrum of a system operating at one selected PRF and a plurality of filter characteristics which are selectively adapted to be utilized. Reference numeral 36, for example, designates the spectral line of the transmitted radar pulse with the lower and upper harmonics thereof being designated by reference numerals 38 and 40, respectively. The ground clutter return comprises a spectral segment designated by reference numeral 42 which is substantially evenly distributed on either side of the spectral lines 36, 38 and 40. The bandwidth (BW) of the clutter return is defined as the points where the amplitude is 6db below its maximum. It can be seen that by selectively varying the rejection band in relation to the pass band of a notch filter, the clutter spectrum can be substantially reduced or cancelled. Notch filter characteristics are illustrated in FIG. 2 for three filters A, B and C, these being provided by selectively altering the feedback constants $K_1$, $K_2$ and $K_3$.

Figure 3:
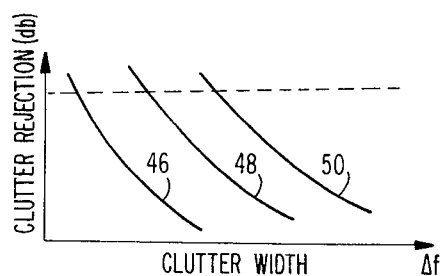
FIG. 3 is a graph representative of characteristic curves of a notch filter providing clutter rejection as a function of clutter bandwidth only.

As noted before, a variable clutter filter which is sensitive to bandwidth of the clutter is controlled of the function of $v \sin\psi$ or $v \sin \psi / f_r$. Typically, such a system exhibits a clutter time domain rejection characteristic as a function of clutter spectral width as shown in FIG. 3. Curves 46, 48 and 50 illustrate the response of filters having increasing reject bandwidths. FIG. 3 further indicates that if a narrower notch were used than $v \sin\psi$ called for when the clutter was relatively small in amplitude, target visibility would be improved while still achieving adequate clutter rejection. This leads to the inventive concept of the subject invention which is the selection of a clutter rejection notch filter characteristic which is a function of clutter amplitude as well as bandwidth. If a signal $v \sin\psi$ which is a function of clutter bandwidth is multiplied by a factor $K(0 \le K \le 1)$ proportional to clutter amplitude and filter notches are selected on the basis of a composite value of $K \, v \, \sin\psi$, then a narrower notch can be selected with resultant increase in target visibility.

To this end signals [I] and [Q] which correspond to the absolute values of the in-phase and quadrature video return echo are derived in the receiver portion of the radar 10 and are fed to a signal summer 52 which provides an output which is equivalent to the output of an envelope detector. A post detection integrator 54 comprised of a second signal summer 56 and a time delay circuit 58 which is coupled in a feedback configuration between the output and one input of the summer 56 provides an average measure of the clutter mean amplitude. This is fed to one input of a coincidence gate comprised of an AND logic circuit 60 whose other input is coupled to a clutter gate circuit 62 which is responsive to an input such as the IF return sinal to enable the AND gate 60 to pass N samples. The clutter gate 62, for example, may be comprised of a one shot multivibrator having a predetermined time period which determines the interval or sampling period of the clutter samples. These N samples appearing at the output of the AND gate 60 are applied to an accumulator which add the selected samples lying at the center of the main beam clutter return and is proportional to a clutter to noise (C/N) of the video signals sampled. The output of the accumulator 64 which comprises the signal K is fed through a "hold and dump" circuit 66 which is controlled by a look sequencer 68 which is triggered by a PRF selector circuit, not shown, in the transmitter portion of the radar 10. The look sequencer is used to determine the period in which a constant PRF is transmitted and defines the radar look time. Thus a signal K is determined for each radar look time and is proportional to the clutter amplitude during which the instant constant PRF is transmitted. This signal K is multiplied with a digital signal applied to a multiplier circuit 70 which digital signal is derived from an analog signal $v \sin\psi$ which has been transformed by means of the analog to digital converter circuit 72. As noted earlier, $v$ corresponds to the radar velocity, i.e. the velocity of the platform which may be for example an aircraft, and $\psi$ is the antenna squint angle. Means for deriving the analog signal $v \sin\psi$ is well known to those skilled in the art and forms no part of the present invention.

The output of the multiplier 70 thus corresponds to a signal $K \, v \, \sin\psi$ which when compared with stored notch filter characteristic threshold values enables the logic circuit 34 to alter the notch filter characteristic accordingly.

The rejection notches for K = 1 are selected as indicated in Table I:

TABLE I

| K | $v \sin\psi$ | Rejection Notch Selected |
|---|---|---|
| 1.0 | 0 to 0.02 | A |
| 1.0 | 0.02 to 0.04 | B |
| 1.0 | 0.04 to 0.06 | C |
| 1.0 | 0.06 to 1 | D |

Figure 4:
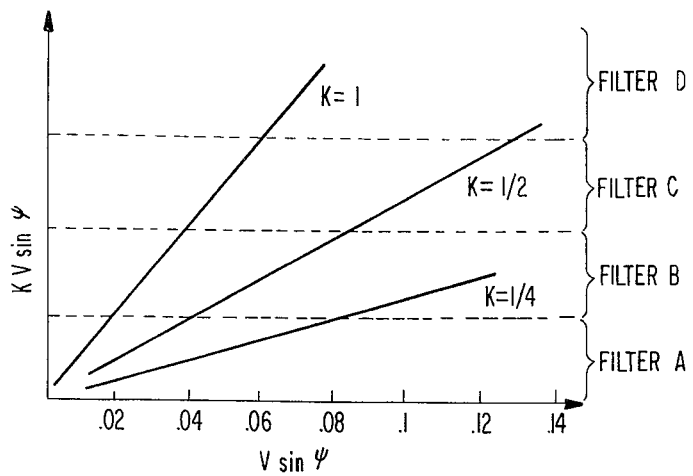
FIG. 4 is a graph illustrative of the clutter rejection notch characteristic determination made in accordance with the subject invention.

FIG. 4 additionally discloses graphically the clutter rejection notch determination value for varying magnitudes of K. Notch A has the smallest rejection bandwidth followed by B, then C and D, with D having the widest reject bandwidth. A clutter to noise ratio substantially less than 40db would allow the generation of K equal to 1/2. In such an instance where $.02 < v\sin\psi < 0.04$, filter A would be enabled instead of B. This results in less but adequate clutter rejection and greater visiblity since even lower clutter to noise ratios would result in even smaller values of K. Since a narrower notch can thus be generated than heretofore required, the resultant target velocity visibility increases.

What has been shown and described, therefore, is a technique for enhancing airborne moving target (AMTI) radar frequency (Doppler) visibility in reduced clutter to noise environments by enabling MTI filters whose rejection capability is dependent upon both clutter level and bandwidth.

We claim as our invention:

1. In a pulse Doppler radar including a transmitter and receiver station wherein the transmitter section is triggered by a train of constant PRF pulses for a predetermined time period defined as the radar look time and wherein the receiver portion detects and digitally processes radar return signals which include a clutter frequency spectrum, the improvement comprising:

MTI digital filter circuit means having an externally controlled filter characteristic coupled to said receiver section and being responsive to the clutter frequency spectrum to selectively attenuate said spectrum in relation to other radar return signals;

clutter spectrum determining circuit means coupled to said receiver section and providing a digital output signal which is a function of both clutter amplitude and bandwidth;

digital storage means having data stored therein comprising a plurality of threshold values corresponding to a respective plurality of predetermined digital clutter filter characteristics; and digital logic circuit means coupled between said clutter spectrum determining circuit means and said storage means, being operable to compare the digital output signal from said clutter spectrum determining circuit means with said threshold values in said digital storage means and gating out a predetermined enabling signal to said MTI filter circuit means when a predetermined comparison is made, causing said digital filter circuit means to provide a predetermined clutter filter characteristic.

2. The invention as defined by claim 1 wherein said clutter filter characteristic comprises a notch filter characteristic.

3. The invention as defined by claim 1 wherein said clutter spectrum determining circuit means comprises:

envelope detector means in said receiver section;

first circuit means coupled to said envelope detector means, said first circuit means being operable to integrate a predetermined number of radar return signal samples during said radar look time and providing a signal therefrom which is a function of the means amplitude of the clutter spectrum;

second circuit means providing a digital signal which is a function of the clutter spectrum bandwidth;

third circuit means coupled to said first and second circuit means, combining the signals provided thereby and coupling a digital output signal therefrom to said logic circuit means which is a function of both clutter amplitude and bandwidth; and fourth circuit means included in said MTI filter circuit means coupled to said logic circuit means and being responsive to said digital output signal therefrom and controlling the filter frequency rejection characteristic of said filter circuit means as a function of the clutter amplitude and bandwidth.

4. The invention as defined by claim 3 wherein said envelope detector means comprises a signal summer which is responsive to the absolute values of inphase and quadrature components of the detected radar return signals.

5. The invention as defined by claim 3 wherein said first circuit means comprises:

an integrator circuit coupled to said envelope detector means;

a coincidence circuit having a pair of inputs and one output including circuit means coupling one input to said integrator circuit;

a clutter gate circuit responsive to the radar return signals coupled to the other input of said coincident circuit;

a signal accumulator and dump circuit coupled to the output of said coincident circuit;

a look sequencer, operated by said transmitter portion, to determine the radar look time and having an output circuit coupled to said dump circuit for dumping said signal samples at the end of said radar look time; and circuit means coupling said dump circuit to said third circuit means.

6. The invention as defined by claim 3 wherein said third circuit means comprises a digital signal multiplier.

7. The invention as defined by claim 3 wherein said second circuit means comprises an analog to digital converter.

* * * * *